United States Patent [19]

Smith, Jr. et al.

[11] 4,247,445
[45] Jan. 27, 1981

[54] PAINTABLE ONE-COMPONENT RTV SYSTEMS

[75] Inventors: Alfred H. Smith, Jr., Ballston Lake; M. Dale Beers, Schenectady, both of N.Y.

[73] Assignee: General Electric Company, Waterford, N.Y.

[21] Appl. No.: 16,255

[22] Filed: Feb. 28, 1979

[51] Int. Cl.$^3$ .................................. C08L 83/06
[52] U.S. Cl. ....................................... 260/37 SB
[58] Field of Search ............................ 260/37 SB

[56] References Cited

U.S. PATENT DOCUMENTS

| | | |
|---|---|---|
| 2,938,009 | 5/1960 | Lucas ............................ 260/37 SB |
| 3,004,859 | 10/1961 | Lichtenwalner ................ 106/308 |
| 3,035,016 | 5/1962 | Bruner ........................... 260/46.5 |
| 3,065,194 | 11/1962 | Nitzsche et al. ............... 260/37 SB |
| 3,122,522 | 2/1964 | Brown et al. ................... 260/46.5 |
| 3,133,891 | 5/1964 | Ceyzeriat ....................... 260/18 |
| 3,161,614 | 12/1964 | Brown et al. ................... 260/46.5 |
| 3,170,894 | 2/1965 | Brown et al. ................... 260/46.5 |
| 3,175,993 | 3/1965 | Weyenberg ..................... 260/46.5 |
| 3,274,145 | 9/1966 | Dupree ........................... 260/37 SB |
| 3,294,739 | 12/1966 | Weyenberg ..................... 260/46.5 |
| 3,334,067 | 8/1967 | Weyenberg ..................... 260/46.5 |
| 3,382,205 | 5/1968 | Beers ............................. 260/37 SB |
| 3,383,355 | 5/1968 | Cooper ........................... 260/46.5 |
| 3,499,859 | 3/1970 | Matherly ........................ 260/37 SB |
| 3,517,001 | 6/1970 | Berger ............................ 260/248 |
| 3,542,901 | 11/1970 | Cooper et al. .................. 260/825 |
| 3,600,352 | 8/1971 | DuJack ........................... 260/37 SB |
| 3,635,743 | 1/1972 | Smith ............................. 106/288 Q |
| 3,689,454 | 9/1972 | Smith et al. .................... 260/46.5 |
| 3,708,467 | 1/1973 | Smith ............................. 260/185 |
| 3,719,635 | 3/1973 | Clark et al. .................... 260/46.5 |
| 3,759,968 | 9/1973 | Berger et al. .................. 260/448.2 |
| 3,779,986 | 12/1973 | Smith et al. .................... 260/46.5 |
| 3,836,502 | 9/1974 | Schulz ........................... 260/37 SB |
| 3,888,815 | 6/1975 | Bessmer et al. ................ 260/37 SB |
| 3,957,714 | 5/1976 | Clark et al. .................... 260/33.6 SB |
| 4,100,129 | 7/1978 | Beers ............................. 260/37 SB |

*Primary Examiner*—Lewis T. Jacobs
*Attorney, Agent, or Firm*—E. Philip Koltos; Michael J. Doyle; John L. Young

[57] ABSTRACT

A paintable one-component room temperature vulcanizable silicone rubber composition comprising a silanol end-stopped polymer; as the basic filler, calcium carbonate; as a cross-linking agent, an acyloxy functional silane wherein the acyloxy group has from 2 to 30 carbon atoms, and a tin salt of a carboxylic acid as the curing catalyst.

22 Claims, No Drawings

PAINTABLE ONE-COMPONENT RTV SYSTEMS

BACKGROUND OF THE INVENTION

The present invention relates to one-component room temperature vulcanizable silicone rubber compositions and more particularly the present invention relates to one-component room temperature vulcanizable silicone rubber compositions having an acyloxy functional silane as the cross-linking agent.

Room temperature vulcanizable (RTV) silicone rubber compositions are well known. Generally, there are two types of such RTV compositions; a one-component RTV system and a two-component RTV system. The two-component RTV systems generally comprise a base silanol terminated diorganopolysiloxane polymer to which there is added a filler and which is packaged in a separate package. There is then formed the second package of an alkyl silicate or partial hydrolysis product of an alkyl silicate as the cross-linking agent in combination with the metal salt of a carboxylic acid as the curing catalyst. The two packages are stored separately. When it is desired to cure the composition the two packages are mixed and applied to whatever form that is desired. Within a period of 24 hours the resulting mixture will cure to a silicone elastomer either in the presence or absence of moisture. Various types of ingredients can be added to this basic composition such as, self-bonding additives as disclosed in Lampe and Bessmer, U.S. Pat. No. 3,888,815. For instance, in the foregoing Lampe and Bessmer patent there is disclosed an amino functional silane which can be utilized as self-bonding additives for such two-component RTV systems.

There are also SiH-olefin platinum catalyzed room temperature vulcanizable silicone rubber compositions, however, such compositions are not pertinent to the present disclosure and as such will not be discussed in detail. With respect to the above two-component RTV systems these are to be distinguished from the one-component systems. Basically, such one-component RTV systems comprise a silanol-terminated diorganopolysiloxane base polymer to which is added a filler and various other ingredients. There is also added to this mixture of ingredients a functional silane as a cross-linking agent. The two most common cross-linking agents for such one-component RTV systems is an acyloxy functional silane as a cross-linking agent or an alkoxy functional silane as a cross-linking agent, examples of the two being methyltrimethoxy silane and methyltriacetoxy silane. To this cross-linking agent there is also added a metal salt of a carboxylic acid of a metal ranging from lead to manganese in the Periodic Table as the curing catalyst. The foregoing basic ingredients, that is, the silanol polymer, the filler, the functional silane and the metal salt of a carboxylic acid alone or with other additives, are mixed together in an anhydrous state to form a flowable mixture which is packaged as such. When it is desired to cure the composition the seal on the waterproof package is broken, the material is applied to whatever form that is desired and upon exposure to atmospheric moisture, it cures to a silicone elastomer. Examples of such one-package RTV systems are to be found in the following U.S. Pat. Nos.—Bruner, 3,035,016; Ceyzeriat 3,133,891; Nitzsche and Wick 3,065,194; Brown et al 3,161,614; Cooper 3,383,355; Matherly 3,499,859; Cooper et al 3,542,901; Brown et al 3,122,522; Brown et al 3,170,894; Weyenberg 3,175,993; Smith and Hamilton 3,689,454 and 3,779,986; Weyenberg 3,294,739 and 3,340,067; Clark et al 3,719,635; Beers 3,382,205, 3,779,986, 3,065,194, 2,294,739, 3,334,067 and 3,708,467.

The above are not all inclusive of all of the patents in the one-component RTV system, but give a representative description of some of the basic patents in the area. Recently, there issued a Beers, U.S. Pat. No. 4,100,129, which discloses a one-component RTV system having an alkoxy functional silane as a cross-linking agent, that is, methyltrimethoxy silane and a titanium chelate as the curing catalyst which composition is especially useful as a construction sealant. It should be noted herein that when such RTV compositions, specifically the one-component RTV compositions are made in low modulus, they are especially suited as construction sealants, that is, they can be utilized to glaze or seal crevices in window panes in the construction of buildings or homes for sealing purposes to seal the elements out with advantage.

Accordingly, one of the desired properties of a construction sealant in specifically a single dwelling construction sealant is that it be paintable. The reason for this is asthetics. If the silicone sealant is paintable then it can be painted over and will not detract from the asthetics of the home of the building. Such paintable silicone sealants are also desired for high rise construction buildings. However, it should be noted that up to this time silicone sealants have not generally been paintable. An example of a paintable silicone sealant is to be found in the disclosure of DuJack, U.S. Pat. No. 3,600,352, which is incorporated into the present case by reference. Basically, this disclosure discloses a paintable silicone sealant which is produced by intermixing a silanol-terminated polymer with a silicone resin composed of monofunctional units and tetrafunctional units in which there is utilized as a filler, asbestos. Although this sealant has many desirable properties since asbestos is not a desired filler for silicone compositions, it is not an advantageous paintable silicone construction sealant. It also contains a solvent additive which is undesirable for environmental and sealant shrinkage reasons.

Another paintable silicone construction sealant is that disclosed in Schultz, U.S. Pat. No. 3,836,502, which is incorporated into the present case by reference. This patent discloses a two-part RTV system having as the paintable sealant imparting additive, a silane which is obtained by reacting a mercaptosilane with nadic anhydride or nadic methyl anhydride. Although such a silicone RTV sealant is paintable, it is a two-part RTV sealant in one respect, and in the other respect it is not an advantageous composition since it requires the incorporation of the mercaptosilane which is an expensive intermediate. Accordingly, it is highly desirable to find a means for making one-component RTV systems paintable and specifically one-component RTV acyloxy functional RTV systems paintable. The foremost attempt up to the present time at this, is to be found in Clark et al, U.S. Pat. No. 3,957,714, which is incorporated into the present case by reference. Basically, this patent discloses a paintable one-component RTV construction sealant which is paintable and has a monoalkyltriacetoxysilane as the cross-linking agent, and has to use an acicular calcium carbonate as the filler and an organic solvent, that is, to apply the sealant in an organic solvent.

It should be noted that such a composition, while paintable has many disadvantages; the most basic of which is the fact that there is utilized an organic solvent which may cause pollution problems. In another respect, the evaporation of the organic solvent after the application of the sealant results in shrinkage of the sealant which may cause rupture of the sealant from the surfaces to which it has been applied. In another respect, the evaporation of the solvent may cause pollution problems. In a further respect, the evaporation of the solvent upon curing of the sealant and after application of the sealant to the surface desired, will cause the sealant to shrink upon curing. Accordingly, if the paint is applied while there is still some solvent in the sealant, the sealant will further shrink causing the paint that is present on the sealant to crack. However, it should be noted that such one-component system, such as that disclosed in the Clark et al patent above, is paintable.

It should also be noted that calcium carbonate is disclosed as a filler in two-component RTV compositions suitable for dental purposes. Also, calcium carbonate is disclosed as a second and additional filler in the one-component alkoxy functional RTV system of Beers, U.S. Pat. No. 4,100,129. However, it should be noted that when calcium carbonate is disclosed or utilized as a filler in one-component RTV compositions which utilize methyltriacetoxysilane as the cross-linking agent, such compositions become unflowable in the uncured state. One-component RTV compositions have to be flowable in the uncured state otherwise they will not flow out of the caulking tube or to the waterproof package in which they are packaged so that they can be applied to whatever use they are needed for. Accordingly, this may have been the reason why Clark et al, U.S. Pat. No. 3,957,714 teaches the use of a solvent. It should be noted that Clark et al specifies that certain concentrations of solvent are necessary for his composition to be paintable and that an acicular calcium carbonate has to be used in his composition. The disclosure of Beers, U.S. Pat. application, Ser. No. 919,544, filed on June 27, 1978, entitled "Curable Compositions and Process", now abandoned, should also be noted. This patent application discloses a one-component RTV system having as the cross-linking agent an acyloxy functional silane in which the acyloxy group has from 6 to 30 carbon atoms and is most preferably 2-ethylhexanoxy, in combination with a highly trifunctional fluid so as to result in a composition with improved oil resistance and heat resistance as well as low odor and low-corrosiveness. Accordingly, it was unexpected in view of the disclosure of Clark et al that a one-component RTV system could be formulated which is paintable having as the cross-linking agent an acyloxy functional silane in which the acyloxy group has from 6 to 30 carbon atoms.

Accordingly, it is one object of the present invention to provide for an acyloxy functional one-part or one-component RTV system which is paintable.

It is an additional object of the present invention to provide for a solventless one-component RTV system having an acyloxy functional silane as the cross-linking agent, which composition is paintable.

It is yet an additional object of the present invention to provide for a solventless paintable one-component RTV system having an acyloxy functional silane as the cross-linking agent which utilizes several types of calcium carbonate as the filler.

It is yet another object of the present invention to provide for a process for producing a solventless paintable one-component RTV system which utilizes an acyloxy functional silane as a cross-linking agent.

These and other objects of the present invention are accomplished by means of the disclosure set forth herein below.

SUMMARY OF THE INVENTION

In accordance with the above objects there is provided by the present invention, a paintable one-component room temperature vulcanizable silicone rubber composition comprising (A) 100 parts by weight of a silanol end-stopped diorganopolysiloxane polymer where the organo groups are monovalent hydrocarbon radicals and the polymer has a viscosity that varies from 50 to 1,000,000 centipoise at 25° C.; (B) from 200 to 500 parts by weight of calcium carbonate; (C) from 1 to 10 parts by weight of a cross-linking agent of the formula,

where R is a monovalent hydrocarbon radical of 1 to 8 carbon atoms and $R^1$ is a monovalent hydrocarbon radical of 2 to 30 carbon atoms and m is 0 or 1; and (D) from 0.01 to 5 parts by weight of a curing catalyst comprising an organic tin salt of an organic acid or a tin salt of an organic acid. The composition may also contain from 4 to 28 parts by weight of treated fumed silica as a sag control additive and also minor amounts of a polyether as an additional sag control additive. There may also be present in the composition from 0.2 to 4 parts by weight of silylisocyanurate as an adhesion promoter and from 1 to 50 parts by weight of a triorgano silyl end-stopped diorganopolysiloxane polymer having from 10 to 5,000 centipoise viscosity where said organo groups are monovalent hydrocarbon radicals and are preferably methyl. Such a triorgano silyl end-stopped diorganopolysiloxane polymer behaves as a plasticizer in the composition. There also may be present a highly trifunctional silicone fluid in the composition so as to impart heat resistance and oil resistance to the resulting composition disclosed in the foregoing patent application of M. D. Beers, Ser. No. 919,544. Preferably, the cross-linking agent is methyl tris(2-ethylhexanoxy)silane and the tin catalyst is dibutyl tin diacetate.

DESCRIPTION OF THE PREFERRED EMBODIMENT

The basic ingredient or component of the one-component paintable room temperature vulcanizable silicone rubber composition of the present case comprises 100 parts by weight of a silanol end-stopped diorganopolysiloxane polymer where the organo groups are monovalent hydrocarbon radicals and the polymer has a viscosity that varies anywhere from 50 to 1,000,000 centipoise at 25° C. and more preferably has a viscosity that varies from 1,000 to 200,000 centipoise at 25° C. Preferably, the diorganopolysiloxane polymer is a linear polymer that has the formula,

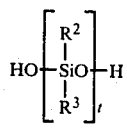

wherein $R^2$ and $R^3$, in the above formula, may be the same or different and are monovalent hydrocarbon radicals and t varies such that the polymer has a viscosity that varies from 50 to 1,000,000 centipoise at 25° C. and more preferably varies from 1,000 to 200,000 centipoise at 25° C. In the formula, $R^2$ and $R^3$ are organo groups in the diorganopolysiloxane polymer, as defined above, and may be selected from any monovalent hydrocarbon radicals such as, for instance, alkyl radicals such as, methyl, ethyl, propyl, etc.; alkenyl radicals such as, vinyl, allyl, etc.; cycloalkyl radicals such as, cyclohexyl, cycloheptyl, etc.; mononuclear aryl radicals such as, phenyl, methylphenyl, ethylphenyl and fluoroalkyl radicals such as, 3,3,3-trifluoropropyl. Most preferably, the organo groups are selected from the group of alkyl radicals of 1 to 8 carbon atoms and phenyl and vinyl. Most preferably, the polymer has the formula set forth in Formula 2, above and is such that it contains, at the most, up to .1 percent by weight of trifunctionality.

The most distinguishing ingredient of the instant composition is the presence of the calcium carbonate which allows the composition to become paintable.

It should be noted that calcium carbonate has two advantages, one, it is inexpensive and second, it makes the present composition paintable as distinguished from other types of extending fillers. It should be noted that fumed silica or precipitated silica do not make the instant composition paintable, but rather, they detract from the paintability properties. Several types of calcium carbonate can be utilized in the instant invention. Thus, there may be utilized in the instant invention the precipitated acicular calcium carbonate of U.S. Pat. No. 3,957,714, or ground calcium carbonate may just as well be utilized to make the instant composition paintable. Accordingly, there is utilized anywhere from 200 to 500 parts by weight of the calcium carbonate, per 100 parts of the silanol end-stopped polymer of Formula (2) above. More preferably, there is utilized anywhere from the 200 parts to the 400 parts of calcium carbonate, per 100 parts of the silanol end-stopped polymer of Formula 2 above. If too little calcium carbonate is utilized, the composition is not sufficiently paintable. If too much calcium carbonate is utilized in the composition, the viscosity of the composition reaches such a point that it becomes unflowable in the uncured state, which is, of course, undesirable in a one-component RTV system. Accordingly, within the limits of 200 to 500 parts, there may be utilized any desired amount of calcium carbonate to obtain the degree of paintability properties required. It should be noted that when the calcium carbonate is incorporated into the silanol end-stopped polymer that the mixture should be mixed with low shear.

As noted in the foregoing Dow Corning, U.S. Pat. No. 3,957,714, high shear mixing takes away from the paintability of the final composition that is produced. It has been found in agreement with the disclosure of the foregoing Dow Corning patent, that if the calcium carbonate, that is, any type of calcium carbonate, is mixed into the silanol end-stopped polymer and to the other ingredients under high shear conditions then there results a composition that is not as paintable as would be desired. On the other hand, if the calcium carbonate is mixed into the other ingredients, that is, the silanol end-stopped diorganopolysiloxane polymer under lower shear conditions, the paintability of the final composition or cured elastomer is enhanced.

Preferably, the calcium carbonate is treated with a cationic exchange resin or stearic acid. This treatment of the calcium carbonate results in the uncured composition having desirable flowability properties in the uncured state even with very high loadings of calcium carbonate. Without the stearic acid treatment or the cationic exchange resin treatment, the calcium carbonate imparts paintability properties to the composition; however, the composition does not have as good flowability properties as would be desirable. The most preferred treating agent for the calcium carbonate is, of course, a stearic acid.

The third necessary ingredient of the one-component RTV system of the present case, is from 1 to 10 parts by weight, per 100 parts of the silanol base polymer of a cross-linking agent of Formula (1), as given previously, where R and $R^1$ are monovalent hydrocarbon radicals of 1 to 8 carbon atoms and $R^1$ is a monovalent hydrocarbon radical of 2 to 30 carbon atoms and more preferably from 5 to 30 carbon atoms, and m is 0 or 1. Preferably, R is an alkyl radical of 1 to 8 carbon atoms such as methyl, ethyl, etc. It can also be an alkenyl radical such as vinyl, allyl, or a mononuclear aryl radical such as, phenyl, however, it is most preferably methyl for ease of synthesis. The $R^1$ radical is a monovalent hydrocarbon radical of 2 to 30 carbon atoms and is most preferably a 2-ethylpentyl or phenyl. However, $R^1$ can be any monovalent hydrocarbon radical of 2 to 30 carbon atoms such as, pentyl, hexyl, cyclohexyl, cycloheptyl, mononuclear aryl such as, phenyl, methylphenyl, ethylphenyl, fluoroalkyl radicals of 2 to 30 carbon atoms. As stated previously, and most preferably, $R^1$ is 2-ethylpentyl or phenyl such that the most preferred cross-linking agents within the scope of the present invention are methyl tris(2-ethylhexanoxy)silane and methyl tris benzoxy silane. The most preferred cross-linking agent being methyl tris(2-ethylhexanoxy)silane. The ingredients, as disclosed above, are mixed together in an anhydrous state and then when applied and exposed to atmospheric moisture will cure to a silicone elastomer, but only over a long period of time. In order to increase the rate of cure there is utilized in the composition a catalyst. The silanes within the scope of Formula (1) which can be utilized as cross-linking agents within the scope of the instant invention are as follows:

$CH_3Si[OCO(CH_2)_4CH_3]_3$ $Si[OCO(CH_2)_4CH_3]_4$

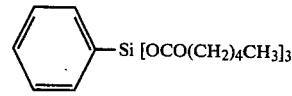

$CH_3(CH_2)_6CH_2Si[OCO(CH_2)_4CH_3]_3$ $CF_3(CH_2)_3Si[OCO(CH_2)_4CH_3]_3$ $NCCH_2CH_2Si[OCO(CH_2)_4CH_3]_3$

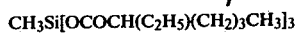

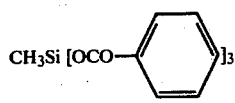

It should be noted that the silane may be preferably utilized at the concentration of anywhere from 3 to 10 parts by weight based on 100 parts of the silanol-terminated polymer. With respect to the catalyst that is utilized in the instant invention, it should be noted that any metal salt of a monocarboxylic acid or dicarboxylic acid can be utilized as the catalyst in the one-component RTV systems of the instant case. However, tin salts of monocarboxylic acids are the preferred catalyst, since they give the desired shelf-life to the composition and give a rapid cure rate to the composition, that is, the compositions of the instant case will fully cure to a silicone elastomer within 24 hours upon being exposed to atmospheric moisture.

With respect to the tin catalyst there can be utilized either an organic tin salt of an organic acid or a tin salt of an organic acid although the former is preferred. As organic acid carbon content of between 2 to 6 provides the best combination of cure rate in ultimate properties. The organic element of the organic tin salt can be 1 or 2 alkyl radicals of from 1 to 6 carbon atoms, for example, monobutyl, dibutyl, and the organic acid radical can have from 2 to 6 carbon atoms. Examples of such tin salts are tindihexanoate, dibutyltindihexanoate, dibutyltindiacetate, dibutyltinadiptate, dibutyltindipropionate, dibutyltindibutyrate, monobutyltintriacetate, etc. This tin salt of any metal salt of a carboxylic acid can be utilized at a concentration of anywhere from 0.01 to 5 parts per 100 parts by weight of the silanol-terminated polymer of Formula (2) above, and preferably it can be utilized at a concentration between 0.02 and 0.3 parts by weight. With these ingredients there is formed the basic paintable one-component system of the instant case. Such ingredients are mixed together with a minimum of shear, as disclosed previously, and packaged in a substantially anhydrous state. When it is desired to cure the composition the seal on the waterproof package is broken and the composition is applied as desired. Upon exposure to atmospheric moisture, the composition will fully cure to a silicone elastomer. The resulting silicone elastomer is paintable once its surface forms a rubbery skin. These ingredients are well-known basic ingredients which are present in the composition and can easily be produced by silicone manufacturers.

The silane of the acyloxy functional silane of Formula (1) is easily produced by reacting an alkyl trichlorosilane with a corresponding carboxylic acid anhydride of the desired hydrocarbon group acid or even by reacting the carboxylic acid itself with the alkyl trichlorosilane to produce the silane of Formula (1), in high yield.

The silanol-terminated diorganopolysiloxane polymer of Formula (2) above is produced in a little more extended procedure. Generally, the process for the production of such silanol-terminated diorganopolysiloxane polymers is to take diorganodichlorosilanes and hydrolyze them; then take the hydrolyzate, add to it potassium hydroxide in catalytic quantities and heat the resulting hydrolyzate at temperatures above 150° C. for periods of time so as to preferentially distill and collect overhead the desired cyclotetrasiloxanes. The cyclotetrasiloxanes are then taken in substantially the pure form and mixed in the desired proportion. To this mixture there is added water or a small quantity of the initial hydrolyzate, that is, an initial hydrolyzate containing a low molecular weight silanol-terminated diorganopolysiloxane polymer, which is utilized as a chain-stopper. When the cyclosiloxanes and the chain-stopper and small quantities of potassium hydroxide, that is, in the neighborhood of 10 to 500 parts per million of potassium hydroxide in the mixture, are heated at temperatures above 150° C. for sufficient periods of time there will result a silanol-terminated diorganopolysiloxane polymer of a viscosity varying from 50 to 1,000,000 centipoise at 25° C. and more preferably varying from 1,000 to 200,000 centipoise at 25° C. It should be noted that in such equilibration procedure, which is the nature of the reaction, that there may be utilized a mild acid such as toluene sulfonic acid as the catalyst instead of the potassium hydroxide. By equilibration reaction it is meant that the cyclosiloxanes equilibrate to form a linear polymer and when 85% conversion rate is reached the maximum amount of cyclosiloxanes have been converted to the linear polymer. At that point, there is as much of the linear polymer being formed as there is of the cyclosiloxane being reformed from the linear polymer. At that point, the reaction is teminated by cooling the reaction mixture, adding a neutralization agent such as, a silyl phosphate, and then the unreacted cyclopolysiloxanes are stripped off to yield the desired polymer at the desired viscosity level.

The viscosity level of the polymer and the molecular weight of the polymer will depend on how much chain-stopper was utilized in the initial reaction mixture since the amount of chain-stopper that is utilized in the reaction mixture will determine the final molecular weight of the silanol polymer that is formed. These reactions are well known to a silicone chemist and can be utilized readily to produce the polymer of Formula (2) above. To the above basic mixture of ingredients which formed the basic mixture of a paintable silicone composition of the instant case, there may be added various additives for various reasons. There may be added anywhere from 4 to 28 parts by weight of fumed silica, per 100 parts of the silanol-terminated diorganopolysiloxane polymer. The purpose of the fumsed silica is two-fold. One, most importantly to act as a sag control additive in the composition and secondly, to act as a reinforcing agent in the final silicone elastomer that is formed. It should be noted that sag control is desirable in a construction sealant, otherwise the sealant will not stay in the crevice in which it is put to, especially a vertical crevice or a crevice overhead, but will pour out of it while it is still in the uncured state. Accordingly, the foregoing amounts of fumed silica are added to the composition so as to impart sag control of the composition. It should be noted that if precipitated silica is utilized, a drying process will have to be devised to remove water to prevent the composition from gelling when it is packaged. Preferably, there is utilized a fumed silica which has been treated with octamethylcyclotetrasiloxanes and various other cyclopolysiloxanes as disclosed in Lucas, U.S. Pat. No. 2,938,009. The purpose of treating the silica is to allow it to act as a sag control agent in the composition without structuring the uncured composition and cause it to be non-sag in the uncured state. Treatment of the fumed silica with octamethylcyclotetrasiloxane and other cyclopolysiloxanes permit the fumed silica to add sag control to the composition without detracting from its flowability properties in the uncured state. It should be noted that too much fumed silica should not be utilized in the composition since this will detract from the flowability properties of the composition and also detract from the low modulus of a desired composition since the addition of fumed silica increases the modulus. Also, the addition of large amounts of fumed silica in the composition would tend to make it unpaintable. Accordingly, the amount of fumed silica is preferably maintained at a minimum, preferably close to the 4–10 parts by weight, per 100 parts of a silanol end-stopped diorganopolysiloxane polymer of Formula (2) above. As an additional sag control additive there may be utilized anywhere from 0.03 to 2.0 parts by weight of a polyether composed of ethylene oxide and propylene oxide groups. The sole purpose of this polyether in combination with the fumed silica, is to permit the use of fumed silica in minimum amounts while imparting maximum sag control to the composition. The use of such polyether allows a minimum amount of fumed silica to be utilized in the composition for sag control purposes and results in a composition with maximum sag control and a minimum amount of fumed silica, thus, resulting in a sealant with a low modulus. Preferably, the polyether is Pluracol V-7, sold by Wyandotte Chemical Corporation, or other polyethers which are sold by the Union Carbide Corporation and sold by the Tradename of Ucon LB-1145. An example of such polyethers in the uses of constuction sealant is to be found in the patent application of Warren Lampe and John H. Wright entitled "Flow Control Agents for One-Package RTV Compounds". There may also be present in the composition a construction sealant adhesion promoter so as to make the composition self-bonding to various substrates. Thus, as disclosed in the patent application of Beers, Ser. No. 919,544 abandoned, there may be present from 0.2 to 2 parts by weight of a silylisocyanurate as an adhesion promoter in the composition. The sole purpose of the adhesion promoter in the composition is to allow the composition to bond to various substrates such as masonry substrates, metal substrates, plastic substrates and glass substrates, and cellulosic substrates without the use of a primer.

Before the advent of such self-bonding additives in RTV systems, it was necessary to utilize a primer, whereupon the primer was applied to the substrate, the solvent was evaporated from the primer, and then after the solvent was evaporated the one-part RTV system would be applied thereover and would bond to the substrates. The self-bonding additives have eliminated the need for primers for such one-part RTV systems, as that of the instant case, for most cases. A recently developed adhesion promoter is bris(trimethoxysilylpropyl)maleate. The use of maleates fumarates, and succinates as self-bonding additives in one-component RTV systems is disclosed in the patent application of George DeZuba, Tyrone Mitchell and Alfred Smith entitled "Self-Bonding Room Temperature Vulcanizable Silicone Rubber Compositions", which disclosure is filed of even date with the present application and which is incorporated into the present case by reference. The foregoing silyl maleates, silyl fumarates, and silyl succinates are even more advantageous as adhesion promoters in the composition of the instant case than the silylisocyanurates of the foregoing Beers case.

It is also desirable to utilize as an additive a plasticizer polysiloxane. Such plasticizer polysiloxanes which are low molecular weight inert polysiloxane polymers improve the low modulus of the composition without detracting from its other properties. Thus, per 100 parts of the silanol-terminated diorganopolysiloxane polymer, there may be utilized from 1 to 50 parts by weight and more preferably from 2 to 40 parts by weight of a triorganosilyl end-stopped diorganopolysiloxane polymer having from 10 to 5,000 centipoise viscosity at 25° C. and more preferably having a viscosity of 20 to 1,000 centipoise at 25° C., where the organo groups are monovalent hydrocarbon radicals. The organo groups in such polymers, which are preferably linear, can be any monovalent hydrocarbon radicals such as, alkyl radicals of 1 to 8 carbon atoms such as, methyl, ethyl, propyl; alkenyl radicals such as, vinyl, allyl; cycloalkyl radicals such as cyclohexyl, cycloheptyl, etc.; mononuclear aryl radicals such as, phenyl, and fluorinated alkyl radicals such as, 3,3,3-trifluoropropyl. For inertness and ease of synthesis of the polymer it is preferable that the organo groups be alkyl radicals of 1 to 8 carbon atoms and most preferably, methyl. The method of synthesis of such polymers is well known. Generally, what takes place is diorganodichlorosilanes are hydrolyzed in the presence of triorganochlorosilanes to yield the polymer. The resulting triorgano linear diorganopolysiloxane polymer that is formed is washed with water and with sodium bicarbonate to reduce its acidity and then as much of the water and the impurities are removed to yield the desired polymer by methods well known in the art.

Most preferably the polymer is a trimethylsiloxy end-stopped dimethylpolysiloxane polymer having a viscosity of anywhere from 10 to 1,000 centipoise at 25° C., and by the nature of the process it may contain a silanol content which is preferably less than 500 parts per million. Finally, as a method for increasing its self-bonding characteristics and increasing its heat resistance and oil resistance, there may be added to the composition anywhere from 2 to 20 parts by weight of a fluid polysiloxane containing a high degree of trifunctionality or a mixture of tri and tetrafunctionality and comprising (i) from 5 to 60 mole percent of monoalkyl siloxy units or a mixture of such units, (ii) from 1 to 6 mole percent of trialkyl siloxy units, and (iii) from 34 to 94 mole percent of dialkyl siloxy units, where said polysiloxane contains from about 0.1 to 2 percent by weight of silanol groups. A highly trifunctional polysiloxane component can be made by means known to those skilled in the art. Generally, this process comprises taking the mixture of monoalkyltrichlorosilanes, dialkyldichlorosilanes and trialkyltrichlorosilanes, silicone tetrachloride or a mixture thereof of the above materials at the appropriate mole ratio that is desired and run them into the mixture of toluene and water. Then the mixture can be heated at about 60° C., for example, for a time of 3 hours or more to insure completion of reaction. The oil phase separates and is neutralized by washing with a mild base and preferably by washing with aqueous solution of sodium carbonate or bicarbonate. After filtration to remove insolubles and devolatilization by heating at above 104° C., and at a vacuum of about 2 mm of mercury, the trifunctional polysiloxane fluid remains as a residue. Preferably, the silicone bonded hydroxyl content is kept to less than 0.6 percent by weight to minimize the viscosity of a final composition and to keep the cross-linking level to a minimum. This is done by heating the residue, as mentioned above, at 110° C., in the presence of approximately 1% of sodium carbonate. The water from a silanol condensation can be conveniently removed by azeotropic distillation with toluene after which removal of toluene by distillation, the product is filtered before use. For more details as to the procedure by which such highly trifunctional fluids/polysiloxane fluids are prepared, one is referred to the disclosure of Beers, U.S. Pat. No. 3,382,205, which is incorporated into the present case by reference. This highly trifunctional polysiloxane material will then be generally utilized at anywhere from 2 to 20 parts by weight, per 100 parts of the silanol end-stopped diorganopolysiloxane polymer and preferably from about 5 to 15 parts per 100 parts by weight of a silanol end-stopped polymer. There may also be utilized as an optional ingredient, an iron oxide thermal stabilizing component which is an item available in commerce in the finally divided form for use as a filler in plastic compositions. Preferably, the iron oxide has a pH in the range of 6.0 to 7.5 to achieve maximum thermal or shelf aging stability. The amount that can be utilized will be in the range of 1 to 10 parts by weight, per 100 parts of a silanol polymer and preferably from 3 to 6 parts by weight, per 100 parts by weight of the silanol polymer. Such iron oxide gives additional thermal stability to the composition at high temperatures. Thermal ingredients such as, flame retardant additives such as, platinum, carbon black, can be added to the composition as well as other stabilizing agent pigments and the like for introducing various types of properties into the instant composition. The basic invention of the instant case is a solventless, paintable, construction one-component RTV sealant which is produced by the incorporation of substantial quantities of calcium carbonate in the absence of any other type of filler, except possibly fumed silica in small quantities in the defined one-component RTV system set forth in the instant claims, that is, the one-component system having the defined cross-linking agent of Formula (1), as was explained above. As should be noted, the instant one-component system results in a paintable cured silicone elastomer in the absence of a solvent, that is, a solvent is nowhere utilized in the instant one-part RTV composition either in its formulation or in its utilization.

The composition of the instant case is stable in the absence of moisture, that is, it can be stored in the absence of moisture for long periods of time, for a period of time of 1, 2, or 3 years without any variation in the final properties of the cured elastomer. It should be noted that the composition of the instant case may be packaged in whatever convenient form that is desired so long as the packaging and mixing is done with low shear and under anhydrous conditions or substantially anhydrous conditions. When it is desired to cure the composition the mixed ingredients are exposed to atmospheric moisture for any period of time of from ½ to 24 hours or more so as to form a cured silicone elastomer. It should be noted that for ease of manufacturing the ingredients are desirable in many cases, to mix the filler, the silanol polymer, the plasticizer and possibly the trifunctional fluid in a separate package to form a base composition in which the mixing is such as to render the composition substantially anhydrous. Then, to such substantially anhydrous base composition there is mixed the other components, the catalyst components, that is, the adhesion promoter, the cross-linking agent and the tin soap which are added in small quantities to the base mixture to form the catalyst composition which is substantially anhydrous and can be stored in a waterproof package for a substantial amount of time. It should be noted that the instant compositions may be packaged and stored in waterproof packages for any amount of time without any deleterious effects. It should be noted that frequently moisture does enter commercial packaging over a period of time such as, 1 or 2 years or more and cures the composition in the package. However, if moisture can be excluded from the composition, the composition will not cure and its uncured properties will be maintained.

The examples below are given for the purpose of illustrating the present invention; they are not given for any purpose of setting limits and boundaries to the definition of the instant invention. All parts in the examples are by weight.

EXAMPLE 1

In the Ross Change Can Mixer there was prepared a mixture comprising 800 parts of a silanol-terminated dimethylpolysiloxane polymer of 3500 centipoise at 25° C. viscosity. To this there was added 240 parts of trimethylsiloxy end-stopped dimethylpolysiloxane linear polymer having a viscosity of 100 centipoise at 25° C. This trimethylsiloxy end-stopped dimethylpolysiloxane polymer was a plasticizer. To this mixture of ingredients there was also added 800 parts by weight of stearic acid treated calcium carbonate and 800 parts of precipitated calcium carbonate. All the fillers were dispersed into the basic polymers under vacuum at 95°±5° C. for one hour. The base was cooled for 20 minutes and then packaged. 150 parts of the aforegoing base mixture was catalyzed in Sem-Kit mixture for 15 minutes with a mixture of 6.0 parts of methyl-tris(2-ethylhexanoxy) silane and 0.075 parts of dibutyl tin dilaurate. The resulting mixture was spread on a paper that was approximately 6" wide×8" long at 20 mils thickness. After curing 24 hours at 25° C., 50% relative humidity, latex acrylic and oil base alkyd paints were painted over the surface. After drying 24 hours, both paints showed excellent paintability to the coating surface and also showed only slight paint pick-off when Lepages N300 tape was pressed to the paint surface and then removed.

EXAMPLE 2

There was prepared a base mixture comprising 100 parts by weight of a silanol-terminated linear dimethylpolysiloxane polymer of 3000 centipoise at 25° C. To this there was added 20 parts by weight of a trimethylsiloxy end-stopped dimethylpolysiloxane linear fluid having 100 centipoise viscosity at 25° C. To this there was added the filler disclosed in Table 1, below. To this there was added 10 parts by weight of a highly trifunctional fluid having 4 mole percent trimethylsiloxy units, 56 mole percent dimethylsiloxy units, 40 mole percent methyl siloxy units, and 0.5 weight percent hydroxyl groups, and 10 parts by weight of octamethylcyclotetrasiloxane treated fumed silica and 0.2 parts of Pluracol V-7, a polyether sold by the Wyandotte Chemical Corporation. To the resulting mixture of base ingredients which was compounded in Ross Change Can Mixer when all the fillers were wet in, there was applied a 6 mm. of mercury vacuum for one hour to remove moisture and air. Then 150 parts of the aforegoing base composition was catalyzed for 20 minutes on a Semco-Sem-Kit catalyzer with the following catalysts, crosslinker and adhesion promoter. The 150 parts of the base mixture was catalyzed with 9.55 parts of the catalyzer mixture. The catalyst mixture comprised 8.5 parts of methyl-tris (2-ethylhexanoxy) silane, 1.0 parts of bis(-trimethoxysilylpropyl) maleate and 0.05 parts of dibutyl tin dilaurate. The resulting mixture was then spread out on paper approximately 4"×6"×1/16" thick and allowed to cure at room temperature for 16–24 hours. The cured coating was coated with Sapolin Sem-Gloss latex paint No. 258, Antique Green, a vinyl acrylic copolymer paint. The results are set forth in Table 1 below. The results in Table 1 show the compositions of the instant case with different types of fillers and the paintability of the composition with different types of fillers. Excellent paintability in Table 1 indicates wetting of the paint to the coating while poor rating is shown by fish eyes or poor wetting of the coated surface. The results are set forth herein in Table 1.

TABLE 1

| | PAINTABILITY OF VARIOUS FILLERS | | | | | | | |
|---|---|---|---|---|---|---|---|---|
| | A | B | C | D | E | F | G | H |
| Compositions | 110 parts 100 mesh water ground mica | 280 parts of 901A Georgia Talc | 360 parts TiO₂ Titanox RA | 375 parts of ground quartz 30 micron Minusil | 375 parts of stearic acid treated CACO₃ Omya BLR-3* | 400 parts of resinate treated CACO₃ Gamma Sperse* Cr-11 | 425 parts of stearic acid treated CACO₃ Gamma Sperse* CR-12 | 400 parts of ground calcium carbonate Atomite* No treatment |
| Paint-ability | Very Poor | Very Poor | Worst of series | Very Poor | Excellent | Excellent | Good-Excellent | Good-Excellent |

*TRADEMARK

As the results of Table I, above indicate, good paintability is obtained only from calcium carbonates of the compositions of the instant case. It should be noted that because of the difference in oil absorption each filler was added until the mixture was loaded to its maximum capacity so as to give accurate comparison in the tests that were run. The results of the tests indicate calcium carbonate in the compositions of the instant case result in a superior paintable silicone, one-part RTV composition as compared to other compositions.

EXAMPLE 3

There was prepared a base mixture comprising 94 parts by weight of a silanol-terminated linear dimethylpolysiloxane polymer of 3000 centipoise at 25° C. To this there was added 20 parts by weight of a trimethylsiloxy end-stopped dimethylpolysiloxane linear fluid having 100 centipoise viscosity at 25° C. To this there was added 420 parts of stearic acid treated calcium carbonate Omya BSH. To this there was added 7.0 parts by weight of a highly trifunctional fluid having 4 mole percent trimethylsiloxy units, 56 mole percent dimethylsiloxy units, 40 mole percent methyl siloxy units and 0.5 weight percent hydroxyl groups, and 10 parts by weight of octamethylcyclotetrasiloxane treated fumed silica and 0.2 parts of Pluracol V-7, a polyether sold by the Wyandotte Chemical Corporation. To the resulting mixture of base ingredients, which was compounded in a Ross Change Can Mixer when all the fillers were wet in, there was applied a 6 mm. of mercury vacuum for one hour to remove moisture and air. Then 150 parts of the aforegoing base composition was catalyzed for 20 minutes on a Semco-Sem-Kit catalyzer with the following catalysts, cross-linker and adhesion promoter. The 150 parts of the base mixture were catalyzed with 9.55 parts of the catalyst mixture. The catalyst mixture comprised 8.5 parts of methyl-tris-(2-ethylhexanoxy)silane, 1.0 parts of bis (trimethoxysilylpropyl) succinate, and 0.05 parts of dibutyl tin diacetate. The resulting mixture was then spread out on paper approximately 4"×6"×1/16" thick and allowed to cure at room temperature for 16–24 hours. The cured coating was coated with Sapolin Sem-Gloss latex paint No. 258, Antique Green, a vinyl acrylic copolymer paint. Excellent paintability was obtained with both the latex and oil base paints.

We claim:

1. A paintable one-component room temperature vulcanizable silicone rubber composition comprising (A) 100 parts by weight of a silanol end-stopped diorganopolysiloxane polymer where the organo groups are monovalent hydrocarbon radicals and the polymer has a viscosity that varies from 50 to 1,000,000 centipoise at 25° C.; (B) from 200 to 500 parts by weight of calcium carbonate; (C) from 1 to 10 parts by weight of a cross-linking agent of the formula,

where R is a monovalent hydrocarbon radical of 1 to 8 carbon atoms and R¹ is a monovalent hydrocarbon radical of 5 to 30 carbon atoms and m is 0 or 1; and (D) from 0.01 to 5 parts by weight of a curing catalyst comprising an organic tin salt of an organic acid or a tin salt of an organic acid.

2. The composition of claim 1 where in (A) the silanol end-stopped diorganopolysiloxane has the formula,

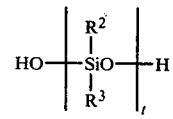

wherein R² and R³ may be the same or different and are monovalent hydrocarbon radicals and t varies such that the polymer has a viscosity that varies from 50 to 1,000,000 centipoise at 25° C.

3. The composition of claim 1 which further contains from 4 to 28 parts by weight of fumed silica treated with octamethylcyclotetrasiloxane.

4. The composition of claim 3 which further contains from 0.03 to 2.0 parts by weight of a polyether as a sag control additive.

5. The composition of claim 4 which further contains from 0.2 to 4 parts by weight of a silylisocyanurate as an adhesion promoter.

6. The composition of claim 5 wherein the composition further contains from 1 to 50 parts by weight of a triorganosilyl end-stopped diorganopolysiloxane polymer having from 10 to 5,000 centipoise viscosity where said organo groups are monovalent hydrocarbon radicals.

7. The composition of claim 6 which further contains from 2 to 20 parts by weight of a fluid polysiloxane containing a high degree of trifunctionality or a mixture of tri-or tetrafunctionality and comprising (i) from 25 to 60 mole percent of monoalkylsiloxy units, siloxy units or a mixture of such units; (ii) from 1 to 6 mole percent of trialkylsiloxy units; and (iii) from 34 to 74 mole percent of dialkylsiloxy units, said polysiloxane containing from about 0.1 to 2 percent by weight of silanol groups.

8. The composition of claim 7 wherein (C) is methyl tris (2-ethylhexanoxy)silane.

9. The composition of claim 7 wherein (C) is methyl trisbenzoxy silane.

10. The composition of claim 8 wherein (D) is an organic tin salt of an organic acid containing from 2 to 6 carbon atoms.

11. The composition of claim 10 wherein (D) is dibutyl tin diacetate.

12. A process for forming a paintable one-component room temperature vulcanizable silicone rubber composition comprising (i) mixing with low shear (A) 100 parts by weight of a silanol end-stopped diorganopolysiloxane polymer where the organo groups are monovalent hydrocarbon radicals and the polymer has a viscosity that varies from 50 to 1,000,000 centipoise at 25° C.; (B) from 200 to 500 parts by weight of calcium carbonate; (C) from 1 to 10 parts by weight of a crosslinking agent of the formula,

where R is a monovalent hydrocarbon radical of 1 to 8 carbon atoms and $R^1$ is a monovalent hydrocarbon radical of 5 to 30 carbon atoms and m is 0 or 1; and (D) from 0.01 to 5 parts by weight of a curing catalyst comprising an organic tin salt of an organic acid or a tin salt of an organic acid; (ii) allowing the composition to cure at room temperature.

13. The process of claim 12 wherein (A) the silanol end-stopped diorganopolysiloxane polymer has the formula,

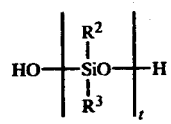

wherein $R^2$ and $R^3$ may be the same or different and are monovalent hydrocarbon radicals and t varies such that the polymer has a viscosity that varies from 50 to 1,000,000 centipoise at 25° C.

14. The process of claim 12 which further contains from 4 to 18 parts by weight of fumed silica treated with octamethylcyclotetrasiloxane.

15. The process of claim 14 which further contains from 0.03 to 2.0 parts by weight of a polyether as a sag control additive.

16. The process of claim 15 wherein (i) the mixture further contains from 0.2 to 4 parts by weight of a silylisocyanurate as an adhesion promoter.

17. The process of claim 16 wherein the composition further contains from 1 to 60 parts by weight of a triorganosilyl end-stopped diorganopolysiloxane polymer having from 10 to 5,000 centipoise viscosity where such organo groups are monovalent hydrocarbon radicals.

18. The process of claim 17 which further contains from 2 to 20 parts by weight of a fluid polysiloxane containing a high degree of trifunctionality or a mixture of tri- or tetrafunctionality and comprising (i) from 5 to 60 mole percent of monoalkylsiloxy units, siloxy units or a mixture of such units; (ii) from 1 to 6 mole percent of trialkylsiloxy units; and (iii) from 34 to 94 mole percent of dialkylsiloxy units, said polysiloxane containing from about 0.1 to 2 percent by weight of silanol groups.

19. The process of claim 18 wherein (C) is methyl tris (2-ethylhexanoxy)silane.

20. The process of claim 18 wherein (C) is methyl trisbenzoxy silane.

21. The process of claim 19 wherein (D) is an organic tin salt of an organic acid containing from 2 to 6 carbon atoms.

22. The process of claim 21 wherein (D) is dibutyl tin diacetate.

* * * * *